(12) United States Patent
Zhang et al.

(10) Patent No.: US 9,497,332 B2
(45) Date of Patent: Nov. 15, 2016

(54) ELECTRONIC DEVICE AND RINGTONE CONTROL METHOD OF THE ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yu Zhang, Shenzhen (CN); Cheng-Ching Chien, New Taipei (TW); Jun-Jin Wei, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/722,316

(22) Filed: May 27, 2015

(65) Prior Publication Data

US 2016/0173702 A1    Jun. 16, 2016

(30) Foreign Application Priority Data

Dec. 11, 2014   (CN) .......................... 2014 1 0764205

(51) Int. Cl.
| | | |
|---|---|---|
| *H04B 1/38* | (2015.01) | |
| *H04M 1/00* | (2006.01) | |
| *H04M 19/04* | (2006.01) | |
| *H04M 3/02* | (2006.01) | |
| *H04W 4/16* | (2009.01) | |
| *H04M 1/725* | (2006.01) | |
| *G06F 3/033* | (2013.01) | |

(52) U.S. Cl.
CPC ............. *H04M 19/042* (2013.01); *H04M 3/02* (2013.01); *H04W 4/16* (2013.01); *G06F 3/033* (2013.01); *H04M 1/72569* (2013.01)

(58) Field of Classification Search
CPC .................................................. H04M 19/042
See application file for complete search history.

(56) References Cited

U.S. PATENT DOCUMENTS

| | | | |
|---|---|---|---|
| 8,346,236 B2* | 1/2013 | Lai ...................... | H04M 1/6058 455/418 |
| 8,649,554 B2* | 2/2014 | Markovic ............... | G06F 3/016 382/103 |
| 8,898,687 B2* | 11/2014 | Hulten ................. | H04N 21/442 725/12 |
| 2008/0134102 A1* | 6/2008 | Movold .................. | G06F 3/017 715/863 |
| 2010/0311465 A1* | 12/2010 | Lai ...................... | H04M 1/6058 455/556.2 |
| 2011/0053581 A1* | 3/2011 | Kao .................. | H04M 1/72519 455/418 |

* cited by examiner

*Primary Examiner* — Tilahun B Gesesse
(74) *Attorney, Agent, or Firm* — Zhigang Ma

(57) ABSTRACT

In a ringtone control method executed in an electronic device receiving a call, an image capturing device captures images of surroundings of the electronic device in the event of receiving a call. The absence or presence of a person in the surroundings of the electronic device is detected and, if a person is found, whether the person is moving towards or away from the electronic device is detected according to the images. If the person is moving towards the electronic device, a ringtone volume of the call is decreased. If the person is moving away from the electronic device, the ringtone volume of the call is increased.

15 Claims, 3 Drawing Sheets ical, and hard disk drives. The term "comprising" means "including, but not necessarily limited to"; it specifically indicates open-ended inclusion or membership in a so-described combination, group, series and the like.

ELECTRONIC DEVICE AND RINGTONE CONTROL METHOD OF THE ELECTRONIC DEVICE

CROSS-REFERENCE TO RELATED APPLICATIONS

This application claims priority to Chinese Patent Application No. 201410764205.7 filed on Dec. 11, 2014, the contents of which are incorporated by reference herein.

FIELD

The subject matter herein generally relates to control technology, and particularly to an electronic device and a ringtone control method of the electronic device.

BACKGROUND

Call services may be often used by a user of an electronic device (e.g., a smartphone). The user may expect that call ringtones of the electronic device can be adjusted automatically. For example, when the electronic device receives a call and the user is far away from the electronic device, a ringtone volume of the call should increase.

BRIEF DESCRIPTION OF THE DRAWINGS

Implementations of the present technology will now be described, by way of example only, with reference to the attached figures.

DETAILED DESCRIPTION

Figure 1:
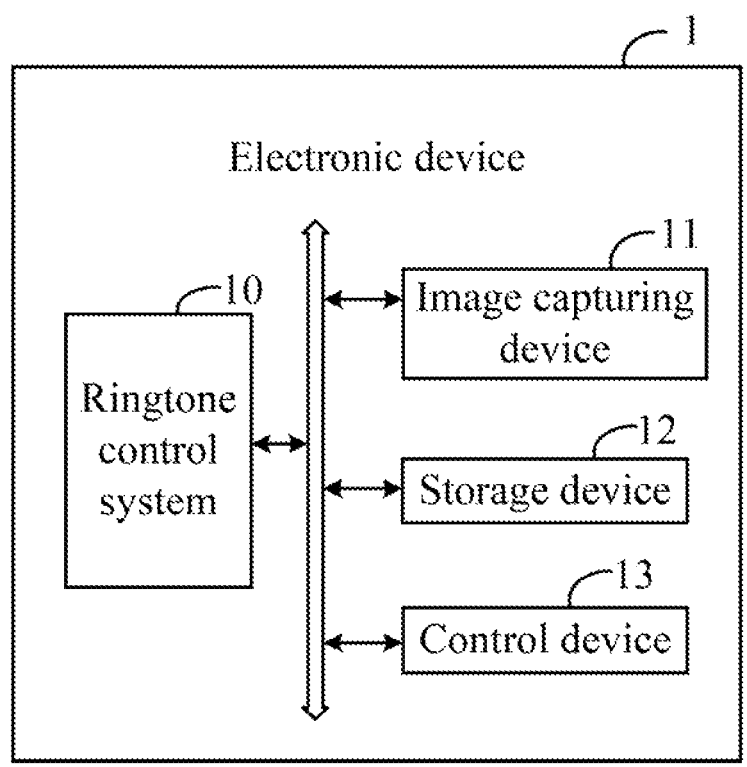
FIG. 1 is a block diagram of one example embodiment of a hardware environment for executing a ringtone control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 is a block diagram of one example embodiment of a hardware environment for executing a ringtone control system 10. The ringtone control system 10 is installed in and run by an electronic device 1. The electronic device 1 can include an image capturing device 11, a storage device 12, and at least one control device 13.

The ringtone control system 10 can include a plurality of function modules (shown in FIG. 2) that adjust call ringtones of the electronic device 1 automatically.

The image capturing device 11 is configured to capture images of surroundings of the electronic device 1. In at least one embodiment, the image capturing device 11 can include multiple wide angle cameras that capture images of all the surroundings of the electronic device 1.

The storage device 12 can include some type(s) of non-transitory computer-readable storage medium such as, for example, a hard disk drive, a compact disc, a digital video disc, or a tape drive. The storage device 12 stores the computerized codes of the function modules of the ringtone control system 10.

The control device 13 can be a processor, an application-specific integrated circuit (ASIC), or a field programmable gate array (FPGA), for example. The control device 13 can execute computerized codes of the function modules of the ringtone control system 10 to realize the functions of the electronic device 1.

Figure 2:
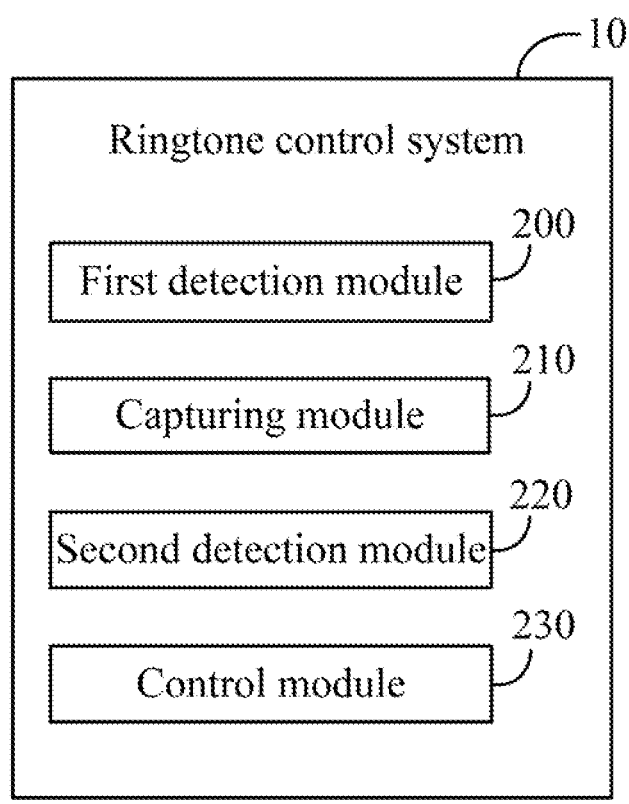
FIG. 2 is a block diagram of one example embodiment of function modules of the ringtone control system in FIG. 1.

FIG. 2 is a block diagram of one embodiment of function modules of the ringtone control system 10. The function modules can include, but are not limited to, a first detection module 200, a capturing module 210, a second detection module 220, and a control module 230. The function modules 200-230 can include computerized codes in the form of one or more programs, which provide at least the functions of the ringtone control system 10.

The first detection module 200 is configured to detect when the electronic device 1 receives a call.

The capturing module 210 is configured to control the image capturing device 11 to capture images of objects around the electronic device 1 when the electronic device 1 receives the call. In at least one embodiment, the capturing module 210 controls the image capturing device 11 to capture images of surroundings of the electronic device 1 at different times. For example, the capturing module 210 controls the image capturing device 11 to capture a first image at a first time, to capture a second image at a later second time, to capture a third image at a third time later still, and controls the image capturing device 11 to capture a fourth image at a fourth and last time.

The second detection module 220 is configured to detect whether there is a person in the surroundings of the electronic device 1, according to the images. In at least one embodiment, the second detection module 220 detects whether there is a face region in the images using a face detection algorithm based on skin color. If the face region is detected from the images, the second detection module 220 determines that a person is present in the surroundings of the electronic device 1. Otherwise, if no face region is detected from the images, the second detection module 220 determines that no person is present in the surroundings of the electronic device 1.

The second detection module 220 is further configured to detect whether the person is moving towards or away from the electronic device 1, or is not moving according to the images. In at least one embodiment, the second detection module 220 detects face regions of the user from the images, and compares the face regions to determine whether the person is moving towards or away from the electronic device 1, or is not moving. For example, the second detection module 220 detects a first face region from the first image and detects a second face region from the second image. If the second face region is larger than the first face region, the second detection module 220 determines that the person is moving towards the electronic device 1. If the second face region is smaller than the first face region, the second detection module 220 determines that the person is moving away from the electronic device 1. If the size of the second face region is same as the size of the first face region, the second detection module 220 determines that the person is not moving.

The second detection module 220 can analyze more than two images to achieve an accurate result. For example, the capturing module 210 controls the image capturing device 11 to capture the first image at the first time, to capture the second image at the second time, to capture the third image at the third time, and to capture the fourth image at the fourth time. The second detection module 220 can analyze the first and second images to obtain a first result (e.g., a result that the person is moving towards the electronic device 1), analyze the second and third images to obtain a second result (e.g., that the moving towards the electronic device 1 is continuing), and analyze the third and fourth images and the fourth image to obtain a third result (e.g., that the moving towards the electronic device 1 is continuing). If the first result, the second result, and the third result are consistent, the capturing module 210 obtains a final result (e.g., a result that the person is moving towards the electronic device 1).

The control module 230 is configured to hang up the call if there is no person in the surroundings of the electronic device 1. In at least one embodiment, if there is no person in the surroundings of the electronic device 1, the control module 230 further informs the caller the call is not answered.

The control module 230 is further configured to decrease a ringtone volume of the call if the person is moving towards the electronic device 1, and increase the ringtone volume of the call if the person is moving away from the electronic device 1. In at least one embodiment, the control module 230 further increases a ringtone duration of the call if the person is moving towards the electronic device 1.

The control module 230 is further configured to increase the ringtone volume or extend the ringtone duration of the call if the person is not moving.

Figure 3:
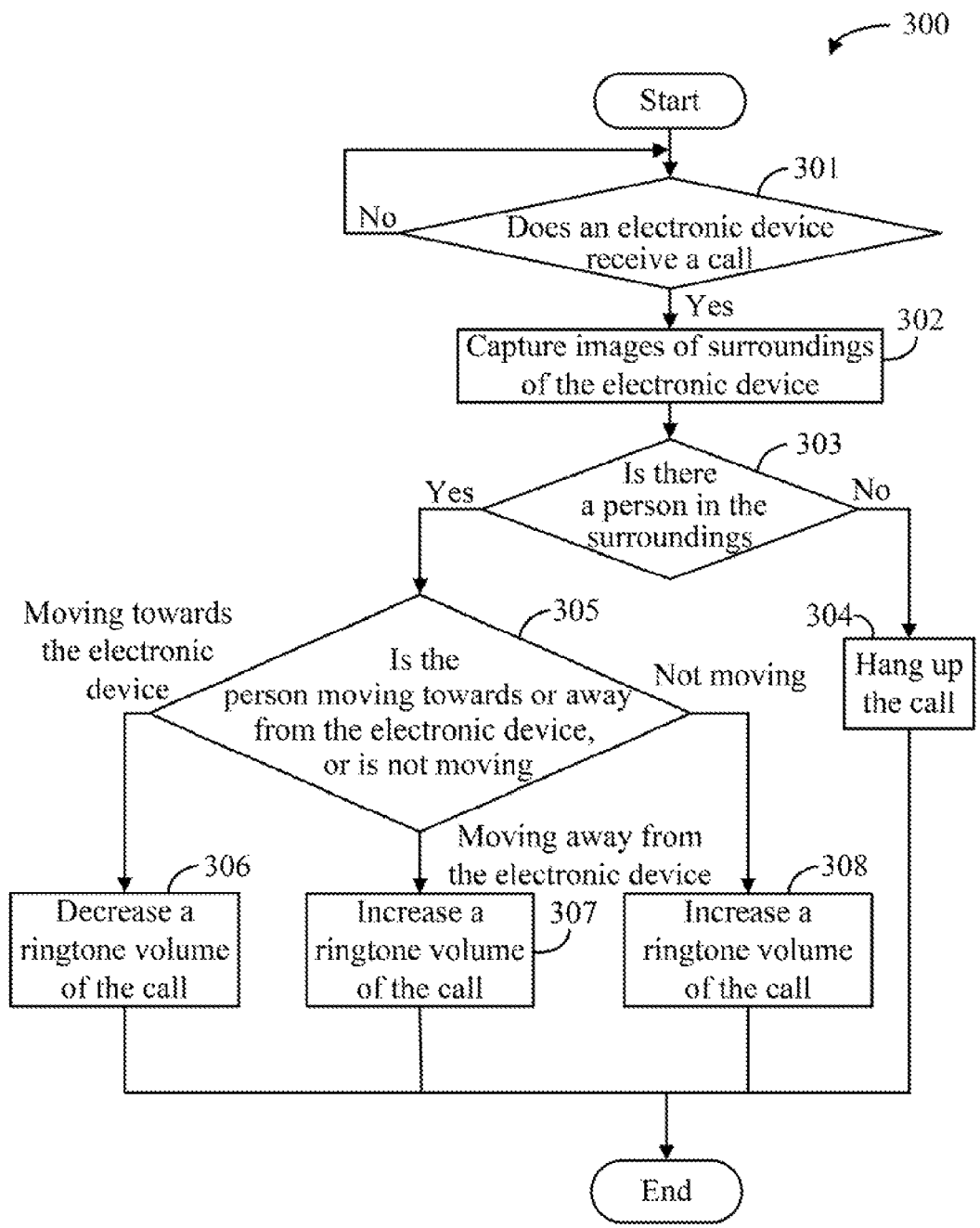
FIG. 3 is a flowchart of one example embodiment of a ringtone control method.

FIG. 3 is a flowchart of one example embodiment of a ringtone control method. In the embodiment, the method is performed by execution of computer-readable software program codes or instructions by a control device, such as at least one processor of an electronic device. The electronic device includes an image capturing device.

Referring to FIG. 3, a flowchart is presented in accordance with an example embodiment. The method 300 is provided by way of example, as there are a variety of ways to carry out the method. The method 300 described below can be carried out using the configurations illustrated in FIGS. 1-2, for example, and various elements of these figures are referenced in explaining method 300. Each block shown in FIG. 3 represents one or more processes, methods, or subroutines, carried out in the method 300. Furthermore, the illustrated order of blocks is illustrative only and the order of the blocks can be changed. Additional blocks can be added or fewer blocks may be utilized without departing from this disclosure. The method 300 can begin at block 301.

At block 301, a first detection module detects when the electronic device receives a call.

When the electronic device receives the call, at block 302, a capturing module controls the image capturing device to capture images of surroundings of the electronic device. In at least one embodiment, the capturing module controls the image capturing device to capture images of the surroundings of the electronic device at different times. For example, the capturing module controls the image capturing device to capture a first image at a first time, to capture a second image at a second later time, to capture a third image at a third time which is later still, and to capture a fourth image at a fourth and last time.

At block 303, a second detection module detects whether there is a person in the surroundings of the electronic device, according to the images. In at least one embodiment, the second detection module detects whether there is a face region in the images using a face detection algorithm based on skin color. If the face region is detected from the images, the second detection module determines that the person is present in the surroundings of the electronic device. Otherwise, if no face region is detected, the second detection module determines that no person is present in the surroundings of the electronic device.

If there is no person in the surroundings of the electronic device, at block 304, a control module hangs up the call. In at least one embodiment, if there is no person in the surroundings of the electronic device, the control module further informs the caller that the call is not answered.

If there is the person in the surroundings according to the images, at block 305, the second detection module detects whether the person is moving towards or away from the electronic device, or is not moving according to the images. In at least one embodiment, the second detection module detects face regions of the user from the images, and compares the face regions to determine whether the person is moving towards or away from the electronic device, or is not moving. For example, the second detection module detects a first face region from the first image and detects a second face region from the second image. If the second face region is larger than the first face region, the second detection module determines that the person is moving towards the electronic device. If the second face region is smaller than the first face region, the second detection module determines that the person is moving away from the electronic device. If the size of second face region is same as the size of the first face region, the second detection module determines that the person is not moving.

The second detection module can analyze more than two images to achieve an accurate result. For example, the capturing module controls the image capturing device to capture the first image at the first time, to capture the second image at the second time, to capture the third image at the third time, and to capture the fourth image at the fourth time. The second detection module can analyze the first and second images to obtain a first result (e.g., a result that the person is moving towards the electronic device), analyze the second and third images to obtain a second result (e.g., a result that the person is continuing to move towards the electronic device), and analyze the third and fourth images to obtain a third result (e.g., a result that the person is continuing to move towards the electronic device). If the first result, the second result, and the third result are consistent, the capturing module obtains a final result (e.g., a result that the person is moving towards the electronic device. If the first result, the second result, and the third result are inconsistent, the flow returns to block 302.

If the person is moving towards the electronic device, at block 306, the control module decreases a ringtone volume of the call. In at least one embodiment, the control module further increases a ringtone duration of the call if the person is moving towards the electronic device 1.

If the person is moving away from the electronic device, at block 307, the control module increases a ringtone volume of the call.

If the person is not moving, at block 308, the control module increases a ringtone volume of the call. In another embodiment, the control module can extend the ringtone duration of the call if the person is not moving.

In other embodiments, the flow ends if there is no person present in the surroundings of the electronic device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size, and arrangement of parts within the principles of the present disclosure, up to and including the full extent established by the broad general meaning of the terms used in the claims.

What is claimed is:

1. A ringtone control method for an electronic device, the method comprising:
   (a) detecting, via a control device, when the electronic device receives a call;
   (b) controlling, via the control device, an image capturing device to capture images of surroundings of the electronic device in event the electronic device receives the call;
   (c) detecting, via the control device, whether there is a person in the surroundings of the electronic device according to the images, and hanging up the call upon condition that there is no person in the surroundings of the electronic device;
   (d) detecting, via the control device, whether the person is moving towards or away from the electronic device upon condition that there is the person in the surroundings of the electronic device; and
   (e) decreasing, via the control device, a ringtone volume of the call upon condition that the person is moving towards the electronic device, and increasing, via the control device, the ringtone volume of the call upon condition that the person is moving away from the electronic device.

2. The method according to claim 1, wherein (c) is implemented by detecting whether there is a face region in the images.

3. The method according to claim 1, wherein (d) is implemented by detecting face regions from the images, and comparing the face regions.

4. The method according to claim 1, further comprising:
   detecting, via the control device whether the person is not moving according to the images; and
   increasing, via the control device, the ringtone volume or extending a ringtone duration of the call upon condition that the person is not moving.

5. The method according to claim 1, further comprising:
   obtaining, via the control device, more than two images that are continuously captured;
   comparing, via the control device, each two continuously captured images to obtain a comparing result between each two continuously captured images; and
   determining, via the control device, whether the person is moving towards or away from the electronic device, or is not moving by determining whether all comparing results are consistent.

6. An electronic device comprising:
   an image capturing device;
   a control device; and
   a storage device storing one or more programs which when executed by the control device, causes the control device to perform operations comprising:
   (a) detecting when the electronic device receives a call;
   (b) controlling the image capturing device to capture images of surroundings of the electronic device in event the electronic device receives the call;
   (c) detecting whether there is a person in the surroundings of the electronic device according to the images, and hanging up the call upon condition that there is no person in the surroundings of the electronic device;
   (d) detecting whether the person is moving towards or away from the electronic device according to the images upon condition that there is the person in the surroundings of the electronic device; and
   (e) decreasing a ringtone volume of the call upon condition that the person is moving towards the electronic device, and increasing the ringtone volume of the call upon condition that the person is moving away from the electronic device.

7. The electronic device according to claim 6, wherein (c) is implemented by detecting whether there is a face region in the images.

8. The electronic device according to claim 6, wherein (d) is implemented by detecting face regions from the images, and comparing the face regions.

9. The electronic device according to claim 6, wherein the operations further comprise:
   detecting whether the person is not moving according to the images; and
   increasing the ringtone volume or extending a ringtone duration of the call upon condition that the person is not moving.

10. The electronic device according to claim 6, wherein the operations further comprise:
    obtaining more than two images that are continuously captured;
    comparing each two continuously captured images to obtain a comparing result between each two continuously captured images; and
    determining whether the person is moving towards or away from the electronic device, or is not moving by determining whether all comparing results are consistent.

11. A non-transitory storage medium having stored thereon instructions that, when executed by a control device of an electronic device, causes the control device to perform a ringtone control method, the method comprising:
    (a) detecting when the electronic device receives a call;
    (b) controlling an image capturing device to capture images of surroundings of the electronic device in event the electronic device receives the call;

(c) detecting whether there is a person in the surroundings of the electronic device according to the images, and hanging up the call upon condition that there is no person in the surroundings of the electronic device;

(d) detecting whether the person is moving towards or away from the electronic device according to the images upon condition that there is the person in the surroundings of the electronic device according to the images; and (e) decreasing a ringtone volume of the call upon condition that the person is moving towards the electronic device, and increasing the ringtone volume of the call upon condition that the person is moving away from the electronic device.

12. The non-transitory storage medium according to claim 11, wherein (c) is implemented by detecting whether there is a face region in the images.

13. The non-transitory storage medium according to claim 11, wherein (d) is implemented by detecting face regions from the images, and comparing the face regions.

14. The non-transitory storage medium according to claim 11, wherein the method further comprises:

detecting whether the person is not moving according to the images; and increasing the ringtone volume or extending a ringtone duration of the call upon condition that the person is not moving.

15. The non-transitory storage medium according to claim 11, wherein the method further comprises:

obtaining more than two images that are continuously captured;

comparing each two continuously captured images to obtain a comparing result between each two continuously captured images; and determining whether the person is moving towards or away from the electronic device, or is not moving by determining whether all comparing results are consistent.

* * * * *